United States Patent [19]
Keller

[11] 3,754,802
[45] Aug. 28, 1973

[54] SELF-ALIGNING BEARING ASSEMBLY
[75] Inventor: Joseph R. Keller, Fairfield, Conn.
[73] Assignee: MPB Corporation, Keene, N.H.
[22] Filed: Jan. 25, 1972
[21] Appl. No.: 220,572

[52] U.S. Cl. ................................................ 308/72
[51] Int. Cl. ............................................ F16c 23/04
[58] Field of Search ................................. 308/72, 29

[56] References Cited
UNITED STATES PATENTS
1,352,204  9/1920  Leitch ................................... 308/72
FOREIGN PATENTS OR APPLICATIONS
469,237  9/1950  Italy ...................................... 308/72
505,973  10/1951  Belgium ............................... 308/72

Primary Examiner—Charles J. Myhre
Assistant Examiner—Frank Susko
Attorney—Pennie, Edmonds, Harry C. Jones et al.

[57] ABSTRACT

A self-aligning bearing assembly having a single piece, stamped housing of general cup-shaped configuration, an opening in the bottom of the housing for seating a spherical bearing ball and spring fingers extending from the bottom of the housing for engaging the diametrically opposite side of the ball and retaining it in the housing.

25 Claims, 14 Drawing Figures

Patented Aug. 28, 1973 3,754,802

SELF-ALIGNING BEARING ASSEMBLY

BACKGROUND OF THE INVENTION

Self-aligning bearing assemblies are generally desirable in structures for supporting a rotating member on a fixed support where costs of manufacture are to be kept low. By using self-aligning bearing assemblies, one can avoid the need for precision bearings and precision alignment of the rotating and fixed parts of the structure with which the assemblies are to be used. The self-aligning feature is also valuable where the structure with which the bearings are used tends to shift or warp out of alignment during use.

Self-aligning bearing assemblies have, in the past, been constructed in different ways. In one construction, the assembly includes a housing, a spherical ball disposed within the housing, and a race member fixed inside the housing for rotatably supporting the ball. Three-piece assemblies of this type of construction are generally expensive to manufacture.

Self-aligning bearing assemblies have also been constructed by forming a combination housing and race from ductile metals or plastic. These two-piece constructions generally require operations which form the material into a shape conforming to the outer surface of the spherical ball. Quite frequently, the housing is formed directly about the spherical ball. In other constructions, the housing is first formed to a shape which will loosely receive the bearing ball. The ball is then inserted and the housing formed to its final shape by deforming it over the ball to retain the latter in place. Although assemblies having their housing constructed in this manner are generally cheaper to manufacture than three-part assemblies, the manufacturing operation is frequently complicated by the need for using the ball as a die in the forming operation of the housing. It is often times desirable to use a spherical ball made of generally soft metal such as sintered bronze. Where such balls are used, special precautions must be taken to prevent marring or other damage to the ball.

Both types of bearing assemblies described above are self-contained units adapted to be assembled as such onto a rotating shaft or similar member for supporting the shaft in a housing structure. Besides these self-contained units, self-aligning bearings have been constructed with half of the spherical support for the ball formed integrally in the structure in which the bearing is to be used. An example of this is found in inexpensive motors where it is necessary to mount the motor shaft for rotation in the bell housing of the motor. The housing includes bores through which the opposite ends of the motor shaft extend. In order to avoid having to precisely align these bores, self-aligning bearings are used to support the ends of the shaft.

In construction, part of the race-like support for these bearings is formed in the bell housing of the motor. More particularly, the bell housing is constructed with a spherical pocket surrounding each bore for receiving each of the spherical balls of the bearings. In order to hold each of the balls in place, a separate cover member is employed. This cover member includes an aperture through which the shaft of the motor extends and has a plurality of spring-like fingers for engaging the ball and holding it in the pocket of the motor housing. The cover member is fastened to the housing usually by rivets or screws. In a construction of the type, it is sometimes desirable to provide supplemental lubricant for the bearing ball. Where this is desired, a separate oil impregnated felt material is positioned between the ball and cover member.

With self-aligning bearing assemblies as last described, a separate operation is required for connecting the assembly into the equipment with which it is to be used. Also, in connecting the assembly, care must be taken to make sure that the felt washer, when used, is properly positioned. These separate assembly steps tend to add to the manufacturing cost of the equipment. Furthermore, binding of the bearing assembly can arise if the cover member is clamped too tightly or not properly aligned relative to the ball and spherical pocket in the housing structure.

SUMMARY OF THE INVENTION

The bearing assembly constructed in accordance with the teachings of the present invention includes a single piece housing structure stamped from sheet metal or molded from plastic and holding a spherical ball therein by spring finger members formed as part of the housing. The housing structure is formed independently of the ball; and the ball is adapted to be positioned within the housing by simply snapping it into place. The bearing assembly is a self-contained unit and can be readily attached to the support structure of the equipment with which it is to be used. Press fitting the housing into a bore provided for this purpose is all that is necessary. No separate attaching cover or members are required. The assembly of the present invention is also readily adapted for receiving a wicking compound which may be injected into the space between the inner spherical ball and the housing structure.

DETAILED DESCRIPTION OF THE PREFERRED EMBODIMENT

Figure 1:
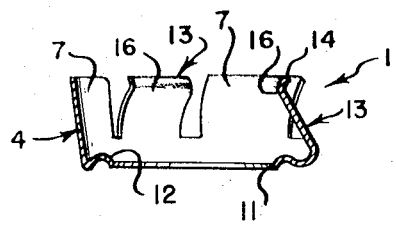
FIG. 1 is a cross-sectional view of the housing of the bearing assembly of the present invention.

FIGS. 1–4 show the construction of the presently preferred embodiment of the invention. The bearing assembly generally includes a housing 1 and a spherical bearing ball 2 positioned therein. The housing of the bearing assembly is constructed from a blank 3 of spring steel and includes a mounting section 4 of cup-shaped configuration for retaining the spherical ball of the assembly. The bearing ball has a bore 5, the center axis 6—6 of which defines the axis of the ball.

Figure 3:
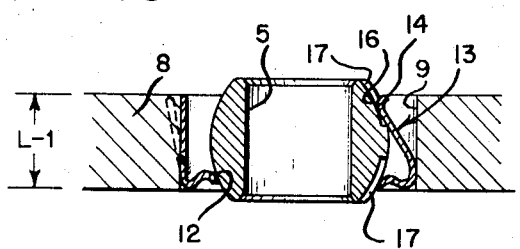
FIG. 3 is a cross-sectional view of the bearing assembly of the present invention.

The mounting section of the housing is comprised of three support fingers 7. These fingers extend from the botto end of the mounting section toward the open end in a diverging pattern and are spaced from each other at their free ends. The diverging construction of the support fingers coupled with their spring characteristics is advantageously used in mounting the assembly into the support structure of the equipment with which it is to be used. It is simply necessary to provide the support structure with a bore and the bearing assembly can be fixed therein by pushing it into the bore. The assembly will be held by a press fit and the diverging support fingers will readily compensate for an inaccurately sized bore in the support structure. FIG. 3 shows a support 8 having a bore 9 for mounting the assembly. The diverging nature of the support fingers is shown in dotted lines.

Figure 5:
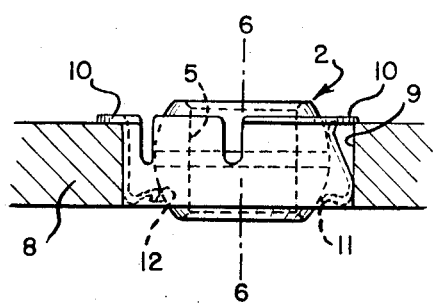
FIG. 5 is a side view of the modified embodiment of the bearing assembly of the present invention.
Figure 6:
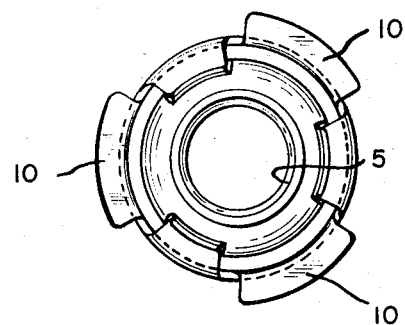
FIG. 6 is a plan view of the bearing assembly shown in FIG. 5.

To positively locate the assembly axially within the bore of the support 8, the support fingers 7 may be provided with radially outwardly extending flanges 10. A housing of this construction is shown in FIGS. 5 and 6. The flanges will seat against the side surface of the support 8 surrounding the bore 9. This will prevent further axial movement of the assembly into the bore. Screws or similar means, not shown, may be provided for fixing the assembly in the bore of the support 8. Such means would connect the flanges 10 to the support surface. With this construction, axial movement of the assembly in either direction would be prevented if this should be required.

The mounting section of the housing includes a circular opening 11 at its bottom end. The structure of the mounting section surrounding the opening 11 provides a bottom bearing surface for the spherical ball. More particularly, the mounting section is formed into a reverse bend so as to extend radially inwardly of the opening, first in a direction toward the open end of the mounting section and then in a reverse direction. With this bending, the inner surface 12 of the mounting section defines the actual bearing surface against which the spherical ball will seat when assembled in position. This seating will occur along a small circle on the outer spherical surface of the ball.

Figure 7:
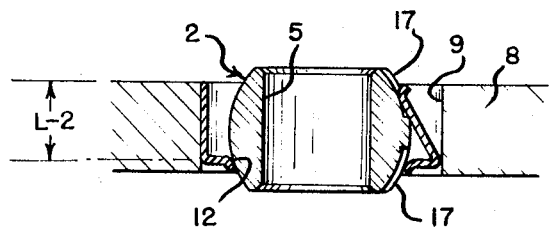
FIG. 7 is a cross-sectional view showing a modified housing construction of the bearing assembly.

As shown in FIG. 7, the reverse bend of FIG. 3 can be replaced by a single bend with the inner surface 12' providing the smooth bearing surface for the ball. With the reverse bend construction of FIG. 3, the axial length L–1 of the mounting section will be greater than the length L–2 in the single bend construction of FIG. 7. This is advantageous in that it provides more axial support for the mounting section of the bearing assembly within the bore 9 of the support 8.

In addition to the support fingers 7, the housing includes bearing fingers 13. These fingers are integral with the mounting section of the housing at the bottom end thereof. They extend toward the open end of the mounting section with their free ends 14 spaced from each other. The free ends engage the outer surface of the ball along a small circle on the diametrically opposite side of the ball from the point where the ball engages the bearing surface 12.

Figure 2:
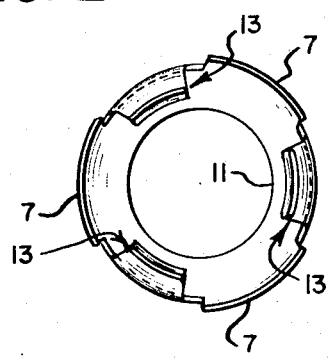
FIG. 2 is a top plan view of the housing shown in FIG. 1.
Figure 8:
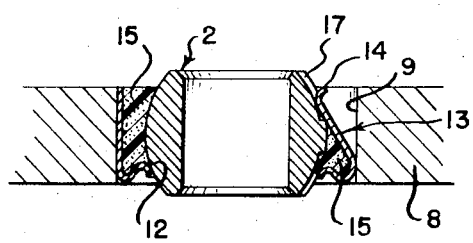
FIG. 8 is a cross-sectional view of a modified embodiment of the bearing assembly shown in FIG. 3.

As seen from FIG. 2, the housing is constructed with three bearing fingers 13 disposed in an alternating pattern with the support fingers 7. The support fingers 7 together with the bearing fingers 13 define the side portions of the cup-shaped configuration of the housing. As shown in FIG. 3 these fingers are spaced from the ball intermediate their ends so that the only contact with the ball is along the surface 12 of the mounting section and at the free ends 14 of the bearing fingers. This construction provides a space between the housing and the ball in which a suitable wicking means may be placed. In the preferred construction, an injectable wicking compound comprised of a polymer matrix saturated with oil is injected into this space. A suitable wicking compound for this purpose is POLY-OIL manufactured by General Polymeric Corporation of West Reading, Pennsylvania. This lubricating compound contains 92–98 percent oil by weight. The oil is held in a polymer matrix. The compound has the consistency of grease and is susceptible to being injected into unconfined spaces. The bearing assembly of FIG. 3 is shown in FIG. 8 with the wicking compound designated at 15.

To provide a smooth bearing surface between the ball and the bearing fingers, the latter are shaped as shown in FIG. 3. In particular, the free ends extend radially inwardly of the periphery of the housing and are then bent so as to extend radially outwardly of the housing. With this construction the innermost smooth surface 16 of the fingers provides the actual point of engagement with the ball while the outwardly diverging tips of the fingers provide a smooth opening and thus facilitate the insertion of the ball into the housing.

In order that the ball be properly retained within the housing, the bearing fingers are formed with an initial shape so that their free ends at the surfaces 16 define a circle which is smaller than the circle on the ball along which they will engage. The spring nature of these fingers readily permits the initial insertion of the ball into the housing with the fingers snapping back into bearing engagement with its outer surface. The spring-like grasp of the outer spherical segment of the ball also compensates for imperfections on these segments. This feature permits the use of relatively inexpensive unfinished balls, the use of which is impractical in other designs which do not have this compensating ability.

The bearing assembly of the present invention is to be used as a self-aligning bearing in supporting such things as the shafts of inexpensive motors. For this purpose, it is necessary that the bearing ball be permitted to adjust itself within the housing. For example, when two bearing assemblies are used to support the opposite ends of a motor shaft, the bores through the two balls 2 must be able to axially align themselves even though they are not supported in axially aligned bores of the support structure 8. When used in this type of equipment, the housing and ball of the bearing assemblies normally remain stationary in the support housing of the motor and the shaft rotates within the bores of the balls 2.

Figure 4:
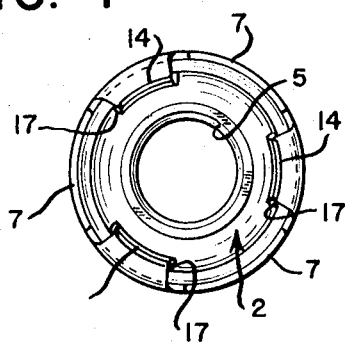
FIG. 4 is a plan view of the bearing assembly shown in FIG. 3.

Under some conditions the ball may temporarily freeze to the motor shaft and tend to rotate within the housing. This is undesirable and in order to prevent this condition from arising, the bearing assembly of the present invention includes means for securing the ball against rotation within its housing. As shown, the ball includes a set of three key slots or grooves 17 in its outer surface adjacent each axial end of the bore 5. Either set of grooves is adapted to cooperate with the bearing fingers 13. As shown in FIGS. 3 and 4, the free ends of these bearing fingers are aligned with and receive the grooves 17. The grooves are elongated in the direction of the fingers and are slightly wider than the fingers. This provides a slight space within which the fingers can move in the grooves so that the ball can align itself properly within the housing of the assembly. Any appreciable degree of rotation will, however, be prevented and thus any temporary freezing of the ball on the motor shaft will not start the ball rotating within its housing.

Figure 9:
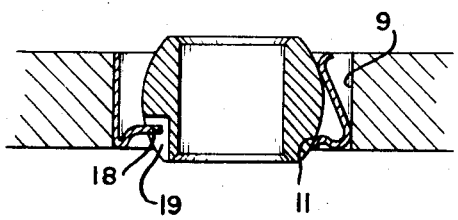
FIG. 9 is a cross-sectional view showing another modified embodiment shown in FIG. 3.

As shown in FIG. 3, a set of grooves is provided adjacent each axial end of the bore of the ball. This construction permits quick assembly of the ball within the housing without regard to which end of the ball is inserted first. Although three grooves are shown, one for cooperating with each of the bearing fingers, one groove would be sufficient. Also, instead of using the bearing fingers to preclude rotation of the ball, the mounting section of the housing can, as shown in FIG. 9, be formed with a tang 18. This tang extends radially inwardly of the opening 11 and into a key slot 19.

Figure 10:
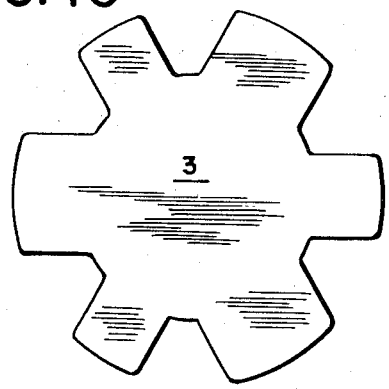
FIG. 10 is a plan view showing the blank from which the bearing assembly of FIGS. 1-4 is constructed.

In accordance with the teachings of the present invention, the housing of the bearing assembly is advantageously stamped from sheet metal. The shape of the blank from which the housing of FIGS. 1–4 is formed in shown in FIG. 10. This blank is first formed, by suitable dies, into a cup shape. Subsequent operations will then perform the cutting of the opening 11 and the bending of the mounting section and bearing fingers to provide the appropriate bearing surfaces 12 and 16. The bearing fingers may, if desired, be formed to the configuration shown during the initial cup-shaped forming operation. Alternatively, a series of individual dies can be used to perform the cutting and forming operations with the operation being performed consecutively. The construction of the housing is such that it lends itself to inexpensive fabrication using low cost stamping techniques.

After the housing is formed automatic assembly equipment is used for locating the ball within the housing. With the bent configuration at the free ends of the bearing fingers, the ball is readily insertable into the housing. The smooth contact surface of the bearing fingers with the ball permits this and also precludes damage to the ball which might otherwise occur if the ball were to rub against the cut edge of the fingers. Quite often the ball used in self-aligning bearing assemblies is of soft material such as sintered bronze. Such a ball would be easily scratched or marred by rubbing against the tips of the steel bearing fingers. After the ball is inserted into the housing, relative rotation between the ball and housing will be effected to permit the bearing fingers to fall within the depressed grooves.

The bearing assembly of the present invention is a self-contained unit and can readily be attached to support structure for rotatably supporting a motor shaft or similar member within the bore of the ball. The assembly can also be used in supporting a structure for rotation on a fixed shaft. Here, such structure is provided with bores in both ends in which two bearing assemblies are secured. The stationary support shaft for this structure extends through the bores of the two bearing assemblies to provide the necessary support. In this construction, the bearing assemblies would rotate on the shaft with the structure in which it is secured. An example of this construction is the mounting of the rotating brush roller used in vacuum cleaners on a fixed support shaft.

In forming the housing of the bearing assembly, spring steel is used and heat treated to produce a spring temper. Although the preferred embodiments of the present invention employ a spring steel, the housing could be formed from molded plastic or other metals such as beryllium copper. Also, the bearing ball of the assembly could be made of other materials than sintered bronze. For example, sintered iron can be used at lower costs. Also, plastic, steels or other materials can be used depending on the particular application for which the assemblies are made.

Figure 11:
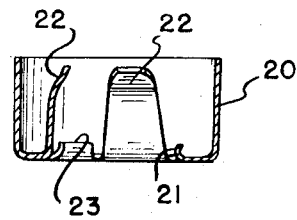
FIG. 11 is a cross-sectional view of a modified housing construction of the bearing assembly of the present invention.
Figure 12:
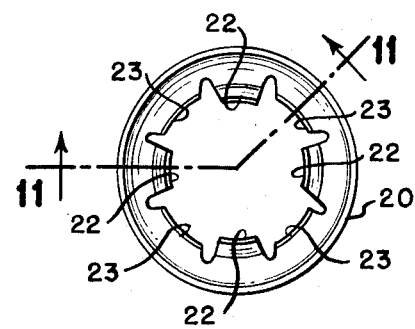
FIG. 12 is a plan view of the housing shown in FIG. 11.

In the bearing assembly described above, the outer periphery of the housing is defined by the three support fingers and the three bearing fingers. As an alternative construction, the housing can be formed with a continuous outer surface. Such a construction is shown in FIGS. 11 and 12. Here, the support section of the housing is defined by the cylindrical wall surface 20. As with the construction of FIGS. 1–4, the housing is cup-shaped and an opening 21 is cut at the bottom end. This opening is cut in such a pattern to leave material for forming the bearing fingers 22. After formation, these bearing fingers are bent upwardly so that their free ends will engage a ball when inserted into the housing. As shown in FIG. 12, four bearing fingers 22 are provided. These fingers are spaced from each other; and between each one, the bottom of the support section of the housing extends radially inwardly to provide additional bearing fingers 23. These fingers support the ball on the side diametrically opposite the point where the bearing fingers 22 make contact.

In the construction shown in FIGS. 11 and 12, the bearing fingers do not have the outwardly directed tips as shown in FIGS. 1–4. Also, the bearing surfaces defined by the ends of the fingers 23 do not have a reverse bend as in the construction of FIG. 3. It is understood, however, that these features can be included in the embodiment of the invention shown in FIGS. 11 and 12.

Figure 13:
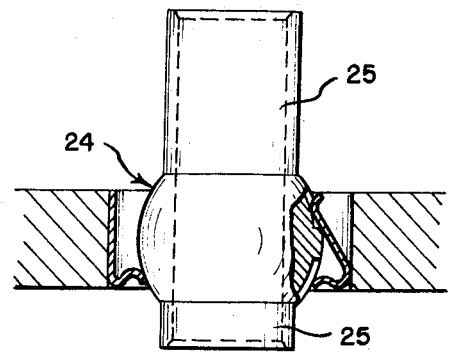
FIG. 13 is a cross-sectional view of the bearing assembly of the present invention showing a modified construction of the bearing ball.

It is also to be understood that the construction of the ball can be changed from that shown in FIGS. 1–4. In FIG. 13, for example, the ball 24 is shown as being provided with trunnions 25. This construction is particularly suitable for motors requiring extended axial support of the motor shaft. Such support can be provided even though the bores of the housing in which the motor shaft is to be mounted may have an axial length no greater than that of the housing of the bearing assembly.

Figure 14:
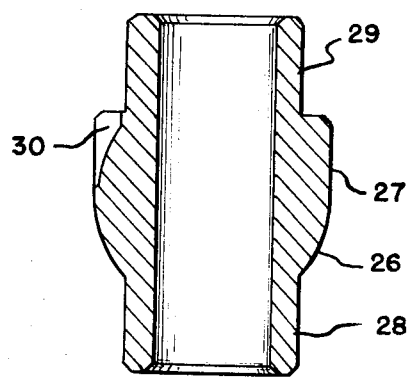
FIG. 14 is a cross-sectional view of a modified construction of the bearing ball.

In another embodiment shown in FIG. 14, the bearing ball is constructed with an outer spherical surface 26 on one diametric side and a cylindrical surface 27 on the opposite side. The ball also has trunnions 28 and 29. The cylindrical surface 27 is grooved at 30 for receiving the bearing fingers 13 of the bearing housing. The surfaces of these grooves are spherical and together with the spherical surface 26, they function as bearing sections for the housing. That is, these surfaces cooperate with the support fingers and bearing fingers of the housing in the same way as in the constructions of FIGS. 1–13. The grooves 30 by receiving the bearing fingers 13, lock the ball against rotation within the housing. Their size, however, is slightly larger than that of the bearing fingers to permit the ball to align itself properly within the housing. The cylindrical construction of the bearing ball on one side facilitates handling of the ball in the automatic equipment used for assembling the balls into housings.

I claim:

1. A bearing housing for holding a bearing ball, having an outer surface with bearing sections defining segments of a sphere, on diametrically opposite sides of said ball, said housing comprising:
   a. a mounting section having:
      1. first fixed bearing means for engaging said ball along said sections on one diametric side and holding it against lateral movement in said housing, and
      2. means for mounting said housing on a support; and
   b. second bearing means comprising a plurality of bearing fingers integral with said mounting section at one of their ends and having their other ends free from said mounting section and spaced from said first bearing means for engaging said ball along said sections on the diametrically opposite side thereof.

2. A bearing housing for holding a bearing ball having an outer spherical shape comprising:
   a. a mounting section having:
      1. first fixed annular bearing means for engaging said ball along a first small circle and holding it against lateral movement in said housing, and
      2. means for mounting said housing on a support; and
   b. second bearing means comprising a plurality of bearing fingers integral with said mounting section at one of their ends and having their other ends free from said mounting section and spaced from said first bearing means for engaging said ball along a second small circle diametrically opposite said first small circle.

3. In a bearing assembly having a housing and a bearing ball held within the housing, said ball having an outer surface with bearing sections defining segments of a sphere on diametrically opposite sides of said ball, the improvement wherein said housing comprises:
   a. a generally cup-shaped mounting section with an open end and a bottom end, said mounting section having:
      1. first bearing means at one end thereof engaging said ball along said sections on one diametric side, and
      2. means for mounting said housing on a support; and
   b. second bearing means comprising a plurality of bearing fingers integral with said mounting section at said one end thereof, said bearing fingers extending toward the other end of said mounting section and engaging said ball along said sections on the diametrically opposite side thereof.

4. A bearing assembly according to claim 3 wherein:
   a. said first bearing means engages said ball along a first small circle; and
   b. said second bearing means engages said ball along a second small circle.

5. A bearing assembly according to claim 4 wherein:
   a. said mounting section is cylindrical in its periphery.

6. A bearing assembly according to claim 5 wherein:
   a. said mounting section has a continuous outer periphery;
   b. said mounting section includes a circular opening in the bottom end thereof;
   c. said first bearing means includes bearing fingers extending radially inwardly of said opening for engaging said ball along said first small circle; and
   d. the bearing fingers of said second bearing means are located radially inwardly of the outer periphery of the mounting section.

7. A bearing assembly according to claim 6 further including:
   a. oil impregnated wicking means disposed between the outer periphery of said mounting section and said bearing fingers of said second bearing means.

8. A bearing assembly according to claim 4 wherein:
   a. said mounting section includes a plurality of supporting fingers extending from the bottom end thereof toward the open end, said supporting fingers having free ends spaced from each other at the open end and defining the means for mounting the housing on a support.

9. A bearing assembly according to claim 8 wherein:
   a. the supporting fingers define a generally circular periphery for said housing.

10. A bearing assembly according to claim 9 wherein:
    a. the free ends of said mounting fingers extend laterally outwardly relative to said circular periphery.

11. A bearing assembly according to claim 9 wherein:
    a. the bearing fingers and mounting fingers are disposed alternately about the periphery of said housing.

12. A bearing assembly according to claim 11 wherein:
    a. there are three bearing fingers and three mounting fingers.

13. A bearing assembly according to claim 11 wherein:
    a. said housing is constructed of stamped spring steel;
    b. the free ends of said bearing fingers where they engage the ball along the second small circle define a circle smaller than said second small circle when no ball is in place within said housing.

14. A bearing assembly according to claim 13 wherein:
    a. the housing is shaped with the portions defining the sides of the cup shape spaced from said ball and with the first and second bearing means defining the sole contact with the ball.

15. A bearing assembly according to claim 14 further comprising:
    a. an oil wicking means disposed in the space between the side portions of the housing and said ball.

16. A bearing assembly according to claim 15 wherein:
    a. said wicking means is a polymer matrix impregnated with oil.

17. A bearing assembly according to claim 13 wherein:
    a. the free ends of the bearing fingers extend radially inwardly of the periphery of the housing and then radially outwardly thereof with the innermost surfaces engaging said ball.

18. A bearing assembly according to claim 17 wherein:
   a. said ball includes at least one groove in its outer surface; and
   b. said housing includes means received within said groove for holding the ball against rotation relative to said housing.

19. A bearing assembly according to claim 13 wherein:
   a. said bearing ball has:
      1. an outer spherical surface on one diametric side, and
      2. a cylindrical surface on the diametrically opposite side; and
   b. the bearing sections on the side of the ball having the cylindrical surface are defined by grooves in said surface.

20. A bearing assembly according to claim 13 wherein:
   a. said bearing ball has an outer spherical surface; and
   b. said ball includes at least one groove aligned with one of said bearing fingers for receiving said bearing finger and holding the ball against appreciable rotation relative to said housing, said grooves being slightly larger in size than said bearing fingers.

21. A bearing assembly according to claim 20 wherein:
   a. said ball includes a bore extending therethrough; and
   b. said ball includes separate grooves aligned with and receiving each of said bearing fingers, said grooves being duplicated adjacent each axial end of said bore.

22. A bearing assembly according to claim 13 wherein:
   a. the three mounting fingers extend in a diverging pattern toward the open end of said mounting section.

23. A bearing assembly according to claim 13 wherein:
   a. said mounting section includes a circular opening at the bottom end thereof; and
   b. said first bearing means is comprised of the mounting section structure immediately surrounding and defining said circular opening.

24. A bearing assembly according to claim 23 wherein:
   a. said first bearing means extends radially inwardly of said opening and away from the open end of the mounting section.

25. A bearing assembly according to claim 24 wherein:
   a. said mounting section, at the bottom end thereof, extends radially inwardly of said opening, first in a direction toward the open end of the mounting section and then in a direction away from the open end.

* * * * *